Figure 1:
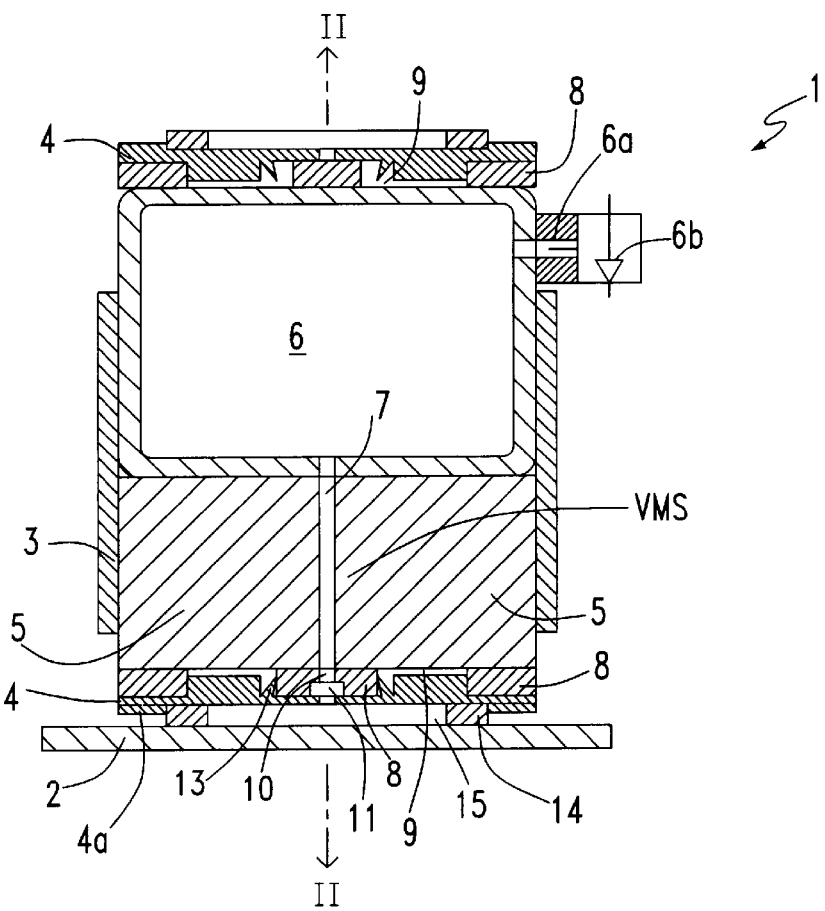

United States Patent
Janzen et al.

[11] Patent Number: 6,102,191
[45] Date of Patent: Aug. 15, 2000

[54] DEVICE FOR TRANSPORTING FLAT, ESPECIALLY PLATE-LIKE OBJECTS

[75] Inventors: Klaus Janzen, Lünen; Unterschrift des Erfinders, Neuberg; Berthold Keller; Karl-Heinz Worm, both of Erfurt, all of Germany

[73] Assignee: Tridelta Magnetsysteme GmbH, Dortmung, Germany

[21] Appl. No.: 09/171,339
[22] PCT Filed: Apr. 11, 1997
[86] PCT No.: PCT/EP97/01822
§ 371 Date: Mar. 22, 1999
§ 102(e) Date: Mar. 22, 1999
[87] PCT Pub. No.: WO97/38927
PCT Pub. Date: Oct. 23, 1997

[30] Foreign Application Priority Data

Apr. 15, 1996 [DE] Germany ............................ 196 47 742
Apr. 15, 1996 [DE] Germany ............................ 196 14 741

[51] Int. Cl.⁷ .................................................. B65G 17/46
[52] U.S. Cl. ...................................... 198/689.1; 198/690.1
[58] Field of Search .............................. 198/688.1, 689.1, 198/690.1

[56] References Cited

U.S. PATENT DOCUMENTS

| | | | |
|---|---|---|---|
| 3,676,979 | 7/1972 | Schuette | 53/112 A |
| 3,708,058 | 1/1973 | Kalven | 198/689.1 |
| 3,710,532 | 1/1973 | Smilek et al. | 53/26 |
| 3,802,699 | 4/1974 | Wiig et al. | 271/64 |
| 3,998,448 | 12/1976 | Gray et al. | 271/12 |
| 4,804,081 | 2/1989 | Lengardt | 198/689.1 |
| 5,036,969 | 8/1991 | Gasbagnati | 198/690.1 X |
| 5,819,907 | 10/1998 | Simkowski | 198/689.1 |

FOREIGN PATENT DOCUMENTS

3908279  5/1990  Germany.

Primary Examiner—James R. Bidwell
Attorney, Agent, or Firm—Rosenman & Colin LLP

[57] ABSTRACT

A device for the transport of flat, in particular platelike objects (2, 2'), with a driven transport band (4, 4') which revolves around a transport band body (3, 3') and on which the objects (2, 2') come to bear during transport, the transport band being provided with intake orifices capable of being loaded with a vacuum by a vacuum system, in such a way that suspended or horizontal transport of magnetic and nonmagnetic flat, in particular platelike objects at high speeds and accelerations becomes possible, via a combined vacuum-magnetic system.

15 Claims, 2 Drawing Sheets

DEVICE FOR TRANSPORTING FLAT, ESPECIALLY PLATE-LIKE OBJECTS

The invention relates to a device for the transport of flat, in particular platelike articles, according to the preamble of patent claim 1.

Such a device is known from DE-A-21 64 859. For the suspended transport of objects, this device has, as a transport band, a flat belt which is provided with vacuum profiling, the objects to be transported being pressed or sucked onto the flat belt by means of a vacuum. In order largely to avoid leakage points in the vacuum system and grasp the objects firmly and effectively, the known device has a vacuum chamber with a smooth underside, in which an elongate slit is made. Below the underside of the vacuum chamber, there is provided, in the first place, a basic band having orifices which are arranged at a distance from one another and, during the movement of the basic band, are located directly below the elongate slit of the vacuum chamber. This basic band possesses, on its underside, a layer of elastic material with orifices which correspond to the orifices of the actual transport band designed as a flat belt, but are larger than these and form suction heads, by means of which the flat objects are grasped by the transport band under the effect of the vacuum in the vacuum chamber. Slip is unavoidable in this device, despite this design, thus leading to restricted positioning accuracy, which is a disadvantage, particularly in the case of high transport speeds and accelerations. Moreover, when relatively heavy objects are being transported, the transport band cannot be prevented from at least partially sagging downward, thus impairing the operating capacity of the vacuum system.

Such a device is also known from DE 295 15 857 U1. This device has a revolving flat belt equipped with suction cups which are connected to a vacuum source and on which the objects rest. Devices of this type, with a flat belt having a vacuum system, are suitable, in principle, for the transport of nonmagnetic objects. However, after the vacuum source has been switched on, vacuum sealing in the case of flat belts of this type cannot take place automatically due to the belt design, thus resulting in a delay in the action of the vacuum after the source has been switched on. The flat belt itself may have slip due to its design, thus leading to restricted positioning accuracy, which has an adverse effect, in particular in the case of high transport speeds and accelerations.

DE 41 05 388 A1 discloses a device for grasping and transporting objects by means of a number of platelike carriers combined to form a revolving conveying chain, each carrier having, on its transport side, at least one intake orifice connected, at least over part of the transport path, to a stationary suction duct which can be closed off in an airtight manner relative to the atmosphere and which leads to a vacuum source, and the carriers being guided adjustably in guide rails which receive edge regions of the carriers, said edge regions running parallel to the direction of transport. This device is relatively complicated, since the means of transport consists of a plurality of individual carriers to be assembled together. A similar device is known from DE 37 01 564 C1.

DE 39 37 668 A1 discloses a conveying device for the horizontal transport of vessels, which is designed as a slat conveyor. In this case, a vacuum conveying plane is provided by arranging suction ducts between the upper strand and the lower strand, the interspaces present at the connection points of the individual slats of the slatted chain forming the intake orifices for the intake duct. This device is designed, in particular, for the horizontal transport of light plastic bottles or the like and not suitable for the suspended transport, of, in particular, heavy objects.

DE 39 08 279 A1 discloses a holding or adhesion device which serves for lifting and/or pivoting objects, but is not designed, and is not suitable, as a transport device in the sense of a transport band. The holding or adhesion device may have both magnetic elements and suction means as the holding or adhesion means.

DE 42 10 188 A1 discloses a conveying device for the horizontal transport of products along a predetermined conveying line, said device having at least one guide element which defines the conveying line and on which transport carriers are guided, the latter being designed in such a way that products can be laid onto or held on these. A revolving drive element, to which the transport carriers can be coupled, is provided in the region of the guide element, the revolving drive element consisting of magnetizable material, and the transport carriers having a magnetic coupling element which comes into interaction with the magnetizable material of the drive element, adheres to this and thus couples the associated transport carrier to the revolving drive element. This device is obviously suitable only for the horizontal transport of products which are laid onto the transport carriers or fastened to these.

For example, DE-A-19 30 896 and DE 25 54 046 C2 disclose, for the transport of ferromagnetic objects, magnetic conveyors in which the magnetic systems are integrated into the body of the transport band and, due to the magnetic effect on the objects, ensure that these adhere to the transport band. However, such an device is suitable only for the suspended transport of ferromagnetic objects; nonmagnetic objects cannot be transported by means of such an device. A further magnetic conveyor of this type is known from DE 31 47 414 A1. This conveyor has, along the conveying path, rolling bodies which project above the pole face of the holding magnets and on which the ferromagnetic objects to be transported come to bear, and a drag means, said rolling bodies and said drag means taking up the work pieces along the conveying path, the work pieces therefore bearing only on the rolling bodies, but not on a conveyor band, as a result of which friction and therefore wear are to be reduced.

The object of the invention is to develop further a generic device, in such a way that suspended or horizontal transport of magnetic and nonmagnetic flat, in particular platelike objects at high speeds and accelerations becomes possible, while, in the case of suspended transport, the depositing of objects in an exact position is also to be possible by means of the same device.

This object is achieved by means of a device having the features of patent claim 1.

The invention makes available a transport device which allows suspended or horizontal transport and positioning of flat, in particular platelike objects, without these slipping, at high speeds and accelerations, the objects being capable of consisting both of ferromagnetic materials (for example, ferromagnetic sheets) and of nonferromagnetic materials (for example, aluminum sheets or plastic plates). It is thus possible, with only one transport device, to convey and position objects made from different materials, and this may even take place simultaneously. In this mode of operation, both the vacuum system and the magnetic system are then functioning, thus causing the objects to be pressed particularly well onto the transport band surface. When only ferromagnetic objects are transported, it is, of course, also possible, in the individual case, to deactivate the vacuum system temporarily. In this instance, a compact design of the device is achieved, so that the space required by the transport band body is not appreciably greater than that required by known devices with purely magnetic systems.

For suspended transport, provision is particularly advantageously made for a plurality of vacuum-magnetic systems to be arranged one behind the other, as seen in the direction of transport. By activating and deactivating the individual vacuum-magnetic systems differently, it is thus possible to deactivate part regions of the transport band, in such a way that the object located in these regions is deposited exactly in position, while the transport band is capable of functioning in other regions, that is to say objects can be transported and deposited or discarded in another region of the transport band. It is particularly advantageous that, by means of this system, ferromagnetic objects can be separated from non-ferromagnetic objects by switching off the magnetic system.

In order to increase the action of the magnetic systems on the objects to be transported, there is provision for each magnet to have guide strips which are designed as guides for the transport band.

In this case, the guide strips are designed preferably as an integral part of the respective vacuum system, for which purpose there is provision for the guide strips to cover that surface of the magnet which faces the transport band and to have suction orifices connected to the suction lines.

Provision is particularly advantageously made for the transport band to be formed by at least one toothed belt which is preferably provided with ferromagnetic inserts and which is guided in the correspondingly designed guide strips. Using such a toothed belt makes it possible to achieve particularly good vacuum sealing, since, on the one hand, the toothed belt is positioned by positive guidance in the guides formed by the guide strips and, on the other hand, said toothed belt is pressed onto the guide strips due to the vacuum system. Moreover, the toothed belt, on account of its ferromagnetic inserts, is attracted by the magnets, so that sagging of the toothed belt is effectively counteracted. Furthermore, since the teeth are connected nonpositively to the drive wheel, the use of such a toothed belt allows particularly high positioning accuracy.

In order to optimize the vacuum system, there is advantageously provision for the guide strips to have at least one groovelike intake duct which is provided with a sealing face and which is covered on the top side or underside by the toothed belt which, in this region, has intake orifices.

Provision is particularly advantageously made for the intake orifices of the toothed belt to have, on the inside, sealing lips which sealingly cover, along the edge, the groovelike intake duct of the guide strips. This design ensures that, when the vacuum source is switched on, largely selfholding vacuum sealing is produced. The frictional forces remain controllable and are largely independent of the coefficient of friction of the transport band loaded with objects. There is no need for special additional positive guidance of the toothed belt on the sealing face.

The vacuum system may advantageously also be optimized by providing the toothed belt, on its side facing the objects, with a plurality of annular elevations which are arranged one behind the other and on which the objects come to bear and which, in conjunction with the intake orifices of the toothed belt, form holding chambers for the objects. These holding chambers are then sealingly covered by the objects to be transported, so that the vacuum losses can be kept low.

Furthermore, there is advantageously provision for designing the sealing lips in such a way that they form a distributor duct, via which the intake orifices moveable together with the toothed belt are connected continuously to the stationary suction orifices. Moreover, the intake orifices may be designed as throttles.

Figure 2:
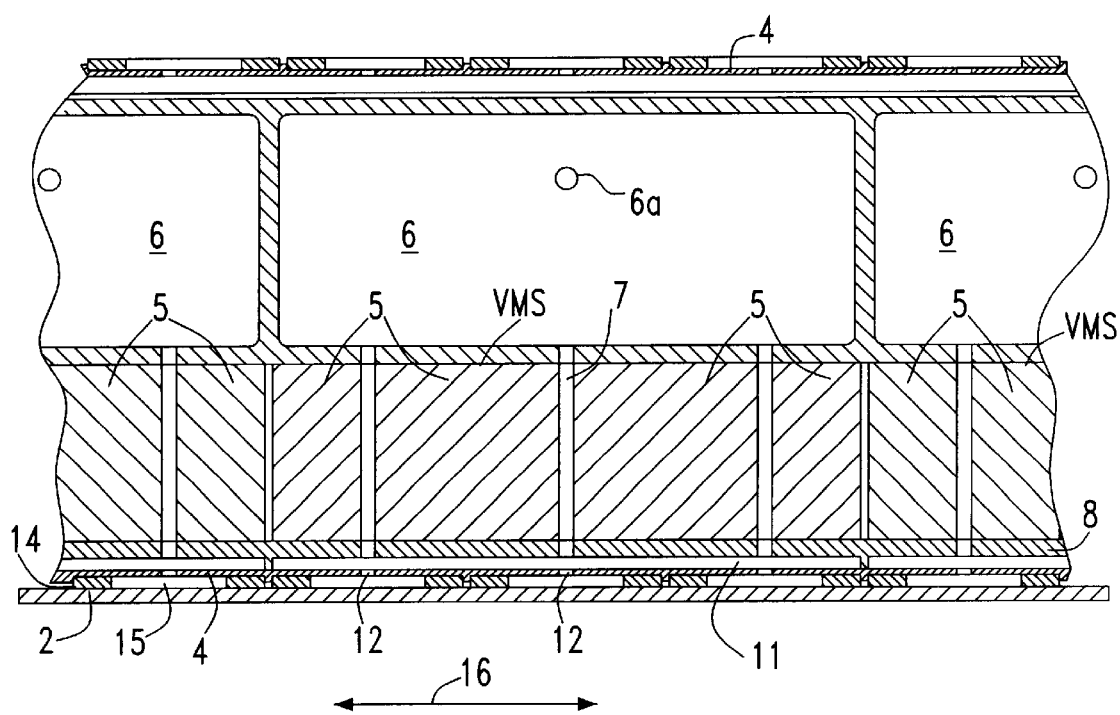
Figure 3:
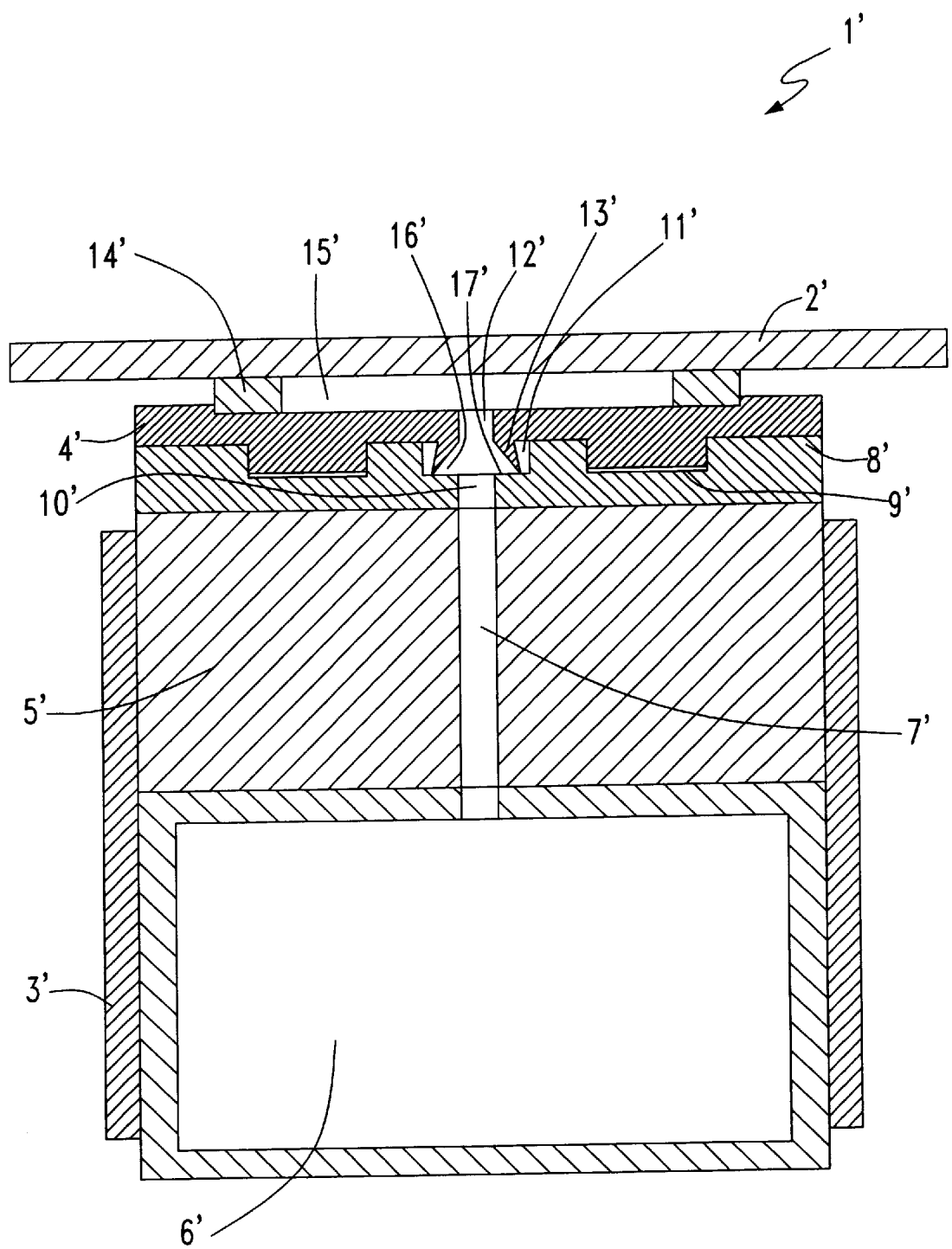

The invention is explained in more detail below by way of example with reference to the drawing in which:

FIG. 1 shows a cross section through a device according to the invention for suspended transport, FIG. 2 shows a section along the line II—II in FIG. 1 and FIG. 3 shows a cross section through a device according to the invention for horizontal transport.

A device for the suspended transport of flat, in particular platelike objects, such as metal sheets, is designated in general by 1 in the drawing. A sheetlike object is partially illustrated and is designated by 2.

The device 1 has a transport band body 3, around which revolves a transport band which is designed as a toothed belt 4 and on which the objects 2 come to bear on the underside for transport purposes. In this case, the direction of transport or conveyance is perpendicular to the illustration in FIG. 1 and is indicated by a double arrow 16 in FIG. 2.

A device for retaining the objects 2 on the surface of the toothed belt 4 is integrated into the transport band body. In this case, this device for retaining the objects is formed, according to the invention, by a plurality of combined vacuum-magnetic systems VMS which are arranged one behind the other, as seen in the direction of transport, and which act on that region of the toothed belt 4 which holds the objects 2.

Each of these vacuum-magnetic systems VMS arranged one behind the other has, first, a magnet 5 arranged adjacently to the toothed belt 4 and a vacuum duct 6 which is connected to a vacuum source 6b via a vacuum connection 6a. Each vacuum duct 6 is connected to the toothed belt 4 via suction lines 7 passing through the associated magnets 5, as described in more detail below. Depending on the overall conveying length of the device 1, a multiplicity of vacuum-magnetic systems VMS, consisting of magnets 5 and vacuum ducts 6, are correspondingly arranged one behind the other in the transport band body 3, FIG. 2 illustrating, merely by way of example, three systems of this type which are arranged next to one another.

The magnet 5 of each vacuum-magnetic system is provided on the underside with guide strips 8 which form guides 9 for the toothed belt 4. In this case, the guide strips 8 at least partially cover the lower surface of the respective magnet 5, said surface facing the toothed belt 4, and have, in the middle region, suction orifices 10 connected to the suction lines 7. These suction orifices 10 in the guide strips 8 open into at least one groovelike intake duct 11 which is provided centrally in the guide strips 8 and which is covered on the underside by the toothed belt 4. The toothed belt 4 has, in this middle region covering the respective groovelike intake duct 11, intake orifices 12 which are provided on the inside with sealing lips 13. In this case, these sealing lips 13 are designed in such a way that they sealingly surround, along the edge, the inner guide strip 8 having the groovelike intake duct 11, so that the groovelike intake duct 11 of the respective guide strip 8 is sealingly closed, with the exception of the suction orifices 10 and intake orifices 12.

The toothed belt 4, over its length, is provided, on its top side facing the objects 2, with a plurality of annular elevations 14 which are arranged one behind the other and on which the objects 2 come to bear and which, in conjunction with the intake orifices 12 of the toothed belt 4, form holding chambers 15 for the objects 2.

The device 1 functions as follows:

In order to activate the vacuum systems VMS, the vacuum source 6b is started, so that either all or only selected vacuum ducts 6 are evacuated via the vacuum connection 6a, which may be opened or closed separately from one another. A vacuum thus forms in the holding chambers 15 of the associated vacuum system via the respective vacuum duct 6, the suction lines 7, the suction orifices 10, the intake orifices 12 and the annular orifices 14, said vacuum sucking onto the surface of the toothed belt 4, in this region, the objects 2 which are to be transported. In the case of ferromagnetic objects 2, this suction is additionally assisted by the magnets 5 of the associated vacuum-magnetic system and the guide strips 8 which are connected to it and which, in the case of ferromagnetic objects, contribute to additionally retaining these on the surface of the toothed belt 4. The toothed belt 4 itself is preferably provided with ferromagnetic inserts 4a, so that it is attracted by the magnets 5 and is prevented from sagging.

By virtue of the make-up of the vacuum systems, along with the design of the sealing lips 13 on the inside of the toothed belt 4, in conjunction with the groovelike intake ducts 11 of the guide strips 8 and with the holding chambers 15, together with the objects 2 bearing thereon, selfholding vacuum sealing is obtained when the vacuum in the respective vacuum system is switched on, the frictional forces of said vacuum sealing remaining controllable and largely independent of the number of vacuum chambers 15 closed by means of objects 2, insofar as said vacuum chambers belong to the same vacuum system.

Due to the possibility of activating and deactivating individual vacuum-magnetic systems VMS, it is possible, by means of one and the same device 1, simultaneously to transport objects 2 in a suspended manner and to lift and deposit exactly in position other objects in another region by respectively activating and deactivating the vacuum-magnetic system in question.

Moreover, the device is, of course, suitable for any suspended transport, that is to say the objects may bear laterally on the transport band and in any other desired angular positions.

FIG. 3 illustrates an device for the horizontal transport of flat, in particular platelike objects, such as metal sheets, said device being designated in general by 1' in the drawing. A sheetlike object is partially illustrated and is designated by 2'.

The device 1' has a transport band body 3', around which revolves a transport band which is designed as toothed belt 4' and on which the objects 2' rest for transport purposes. In this case, the direction of transport or conveyance is perpendicular to the drawing plane illustrated.

A device for exerting a force on the objects 2' toward the surface of the toothed belt 4' is integrated into the transport band body 3'. In this case, this device for exerting a force on the objects toward the transport band surface is formed, according to the invention, by a combined vacuum-magnetic system which acts on that region of the toothed belt 4' which carries the objects 2'.

This vacuum-magnetic system has, first, at least one magnet 5' arranged adjacently to the toothed belt 4' and a vacuum duct 6' which is connected to a vacuum source, not illustrated, and which is connected to the toothed belt 4' via suction lines 7' passing through the magnet 5', as described in more detail below.

The at least one magnet 5' is provided on the top side with guide strips 8' which have guides 9' for the toothed belt 4'. In this case, the guide strips 8' cover that surface of the magnet 5' which faces the toothed belt 4', and have suction orifices 10' connected to the suction lines 7'. These suction orifices 10' in the guide strips 8' open into at least one groovelike intake duct 11' which is provided centrally in the guide strips 8' and which is provided on the underside with a sealing face 17' and is covered on the top side by the toothed belt 4'. The toothed belt 4' has, in the middle region, intake orifices 12' which are designed as a throttle for the purpose of limiting leakage, above all when the holding chambers 15' are not covered by sheets, and for suction and therefore for sealing off the toothed belt 4' on the guide strip 8'. Arranged on the underside of the toothed belt 4' are sealing lips 13' which are longitudinally continuous on the underside and which bear at the end on the sealing face 17' and thus form a longitudinally continuous distributor duct 16', via which continuous suction takes place during the movement of the toothed belt.

The toothed belt 4', over its length, is provided, on its top side facing the objects 2', with a plurality of annular elevations 14' which are arranged one behind the other and on which the objects 2' rest and which, in conjunction with the intake orifices 12' of the toothed belt, form holding chambers 15' for the objects 2'.

The device 1' functions as follows:

In order to activate the vacuum system, the vacuum source, not illustrated, is started, so that a vacuum forms in the holding chambers 15' via the vacuum duct 6', the suction lines 7', the suction orifices 7', the intake orifices 12' and the annular orifices 14', said vacuum pressing or sucking onto the surface of the toothed belt 4' the objects 2' which are to be transported. In the case of ferromagnetic objects 2', this pressing is additionally assisted by the magnets 5' and the guide strips 8' which are connected to them and which, in the case of ferromagnetic objects 2', contribute to additionally pressing these onto the surface of the toothed belt 4'. By virtue of the make-up of the vacuum system, along with the design of the sealing lips 13' on the underside of the toothed belt 4', in conjunction with the groovelike intake ducts 11' of the guide strips 8 and with the holding chambers 15', together with the objects 2' located thereon, selfholding vacuum sealing is obtained when the vacuum is switched on, the frictional forces of said vacuum sealing remaining controllable and largely independent of the number of vacuum chambers 15' closed by means of objects 2', that is to say the functioning of the device is ensured even when the toothed belt 4, is not covered over its entire length by objects 2'.

Due to the design of the device for exerting forces (vacuum-magnetic system), high transport speeds and, in particular, also exceptionally high accelerations can be achieved. For this purpose, the toothed belt 4' is driven by means of a suitable drive in a conventional way which is not illustrated.

Depending on the properties of the objects 2' to be transported, both the respective magnetic system and the respective vacuum system can be activated during transport, but it is also possible, in principle, to activate these separately from one another, if this is sufficient in the particular case. Furthermore, it goes without saying that, for the transport of relatively large objects, a plurality of devices of the type described may be arranged next to one another, and the like.

What is claimed is:

1. A device for the transport of objects, said device comprising:

a transport band body;

a driven transport band which revolves around the transport band body and on which band the objects come to bear during transport intake orifices on said band body;

a vacuum for facilitating loading of the band, wherein the vacuum is integrated into at least one combined vacuum-magnetic system (VMS) arranged in the transport band body and which acts on a region of the transport band which carries the objects, wherein each vacuum-magnetic system has:

at least one magnet arranged adjacently to the transport band; and a vacuum duct connected to a vacuum source; and suction lines passing through the magnet connecting the intake orifices to the vacuum duct.

2. The device as claimed in claim 1, wherein the vacuum system comprises plurality of vacuum-magnetic systems (VMS) arranged one behind the other in a direction of transport.

3. The device as claimed in claim 2, further comprising at least one magnet with guide strips which are designed as guides for the transport band.

4. The device as claimed in claim 3, wherein the guide strips a surface of the magnet which faces the transport band and further comprising suction orifices connected to the suction lines.

5. The device as claimed in claim 4, wherein the transport band is formed by at least one toothed belt with inserts and which is guided in the correspondingly designed guide strips.

6. The device as claimed in claim 5, wherein the guide strips have at least one groovelike intake duct with a sealing face and which is covered by the toothed belt having intake orifices.

7. The device as claimed in claim 6, further intake orifices are provided on the inside with sealing lips which sealingly cover, along the edge, the groovelike intake duct of the guide strips.

8. The device as claimed in claim 7, wherein the toothed belt is provided, on its side facing the objects, with a plurality of annular elevations which are arranged one behind the other and on which the objects come to bear and which, in conjunction with the intake orifices, form holding chambers for the objects.

9. The device as claimed in claim 7, wherein the sealing lips form a distributor duct via which the intake orifices moveable together with the toothed belt are connected continuously to the stationary suction orifices.

10. The device as claimed in claim 6, wherein the intake orifices are designed as throttles.

11. The device of claim 1, wherein said device is used for transport of flat, platelike objects.

12. The device of claim 1, further comprising at least one magnet with guide strips which are designed as guides for the transport band.

13. The device as claimed in claim 3, wherein the transport band is formed by at least one toothed belt which is preferably provided with inserts and which is guided in the correspondingly designed guide strips.

14. The device of claim 13, wherein said inserts are ferromagnetic.

15. The device of claim 5, wherein said inserts are ferromagnetic.

* * * * *